United States Patent
Tsirtsis et al.

(10) Patent No.: US 8,570,941 B2
(45) Date of Patent: Oct. 29, 2013

(54) METHODS AND APPARATUS FOR FACILITATING NETWORK-BASED CONTROL OF A FORWARDING POLICY USED BY A MOBILE NODE

(75) Inventors: Georgios Tsirtsis, London (GB); Haipeng Jin, Carlsbad, CA (US); Gerardo Giaretta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 712 days.

(21) Appl. No.: 12/472,239

(22) Filed: May 26, 2009

(65) Prior Publication Data

US 2009/0303932 A1    Dec. 10, 2009

Related U.S. Application Data

(60) Provisional application No. 61/060,078, filed on Jun. 9, 2008.

(51) Int. Cl.
| | |
|---|---|
| *H04W 80/04* | (2009.01) |
| *H04W 84/12* | (2009.01) |
| *H04W 88/06* | (2009.01) |
| *H04W 88/08* | (2009.01) |
| *H04W 84/18* | (2009.01) |
| *H04W 74/08* | (2009.01) |
| *H04L 12/64* | (2006.01) |

(52) U.S. Cl.
USPC ............................ 370/328; 370/338; 370/352

(58) Field of Classification Search
USPC .......... 370/328, 329, 334, 338, 339, 351–356
See application file for complete search history.

(56) References Cited

U.S. PATENT DOCUMENTS

| | | | | |
|---|---|---|---|---|
| 7,106,271 | B1* | 9/2006 | Friday ........................... | 343/853 |
| 2002/0038369 | A1* | 3/2002 | Sung et al. .................... | 709/227 |
| 2002/0052941 | A1* | 5/2002 | Patterson ...................... | 709/223 |
| 2002/0143897 | A1 | 10/2002 | Patil | |
| 2002/0159448 | A1* | 10/2002 | Ito et al. ........................ | 370/389 |
| 2003/0026230 | A1* | 2/2003 | Ibanez et al. .................. | 370/338 |

(Continued)

FOREIGN PATENT DOCUMENTS

| | | |
|---|---|---|
| EP | 1432198 | 6/2004 |
| JP | 2004528767 A | 9/2004 |

(Continued)

OTHER PUBLICATIONS

International Search Report and Written Opinion—PCT/US2009/046634—ISA/EPO—Sep. 30, 2009.

(Continued)

*Primary Examiner* — Ian N Moore
*Assistant Examiner* — Jenee Alexander
(74) *Attorney, Agent, or Firm* — James T. Hagler

(57) ABSTRACT

A mobile node receives access network-specific signaling that is related to an Internet Protocol (IP) flow. The mobile node decides which of multiple access networks to use to send the IP flow based on the access network-specific signaling. The access network-specific signaling may be received from an access network, and the mobile node may interpret the access network-specific signaling as a command to send the IP flow over that access network. The mobile node may update a forwarding policy at the mobile node to indicate that the IP flow should be sent over that access network.

36 Claims, 9 Drawing Sheets

(56) References Cited

U.S. PATENT DOCUMENTS

| | | |
|---|---|---|
| 2003/0074443 A1 | 4/2003 | Melaku et al. |
| 2003/0120135 A1* | 6/2003 | Gopinathan et al. ........... 600/300 |
| 2003/0169771 A1* | 9/2003 | Ahn et al. ..................... 370/497 |
| 2003/0202486 A1* | 10/2003 | Anton et al. .................. 370/329 |
| 2004/0218607 A1* | 11/2004 | Hurtta et al. .................. 370/332 |
| 2005/0220100 A1* | 10/2005 | Kawabe ........................ 370/389 |
| 2006/0056345 A1* | 3/2006 | Marinier et al. .............. 370/329 |
| 2006/0209821 A1* | 9/2006 | Jung et al. .................... 370/389 |
| 2007/0140256 A1* | 6/2007 | Yaqub ........................ 370/395.5 |
| 2007/0149204 A1* | 6/2007 | Redi et al. .................... 455/446 |
| 2007/0177559 A1* | 8/2007 | Jain et al. ..................... 370/338 |
| 2007/0259673 A1* | 11/2007 | Willars et al. ................. 455/453 |
| 2009/0161601 A1* | 6/2009 | Dai et al. ...................... 370/328 |
| 2009/0161605 A1* | 6/2009 | Shen et al. .................... 370/328 |
| 2009/0207808 A1* | 8/2009 | McCann et al. ............... 370/331 |
| 2010/0215019 A1* | 8/2010 | Velev et al. .................... 370/331 |
| 2010/0272021 A1* | 10/2010 | Kopplin et al. ................ 370/328 |

FOREIGN PATENT DOCUMENTS

| | | |
|---|---|---|
| JP | 2006502678 A | 1/2006 |
| RU | 2323545 C2 | 4/2008 |
| WO | WO0013436 A2 | 3/2000 |
| WO | 03058996 A1 | 7/2003 |
| WO | 2007039016 | 4/2007 |

OTHER PUBLICATIONS

Taiwan Search Report—TW098119070—TIPO—Jul. 2, 2012.
Taiwan Search Report—TW098119070—TIPO—Feb. 6, 2013.

* cited by examiner

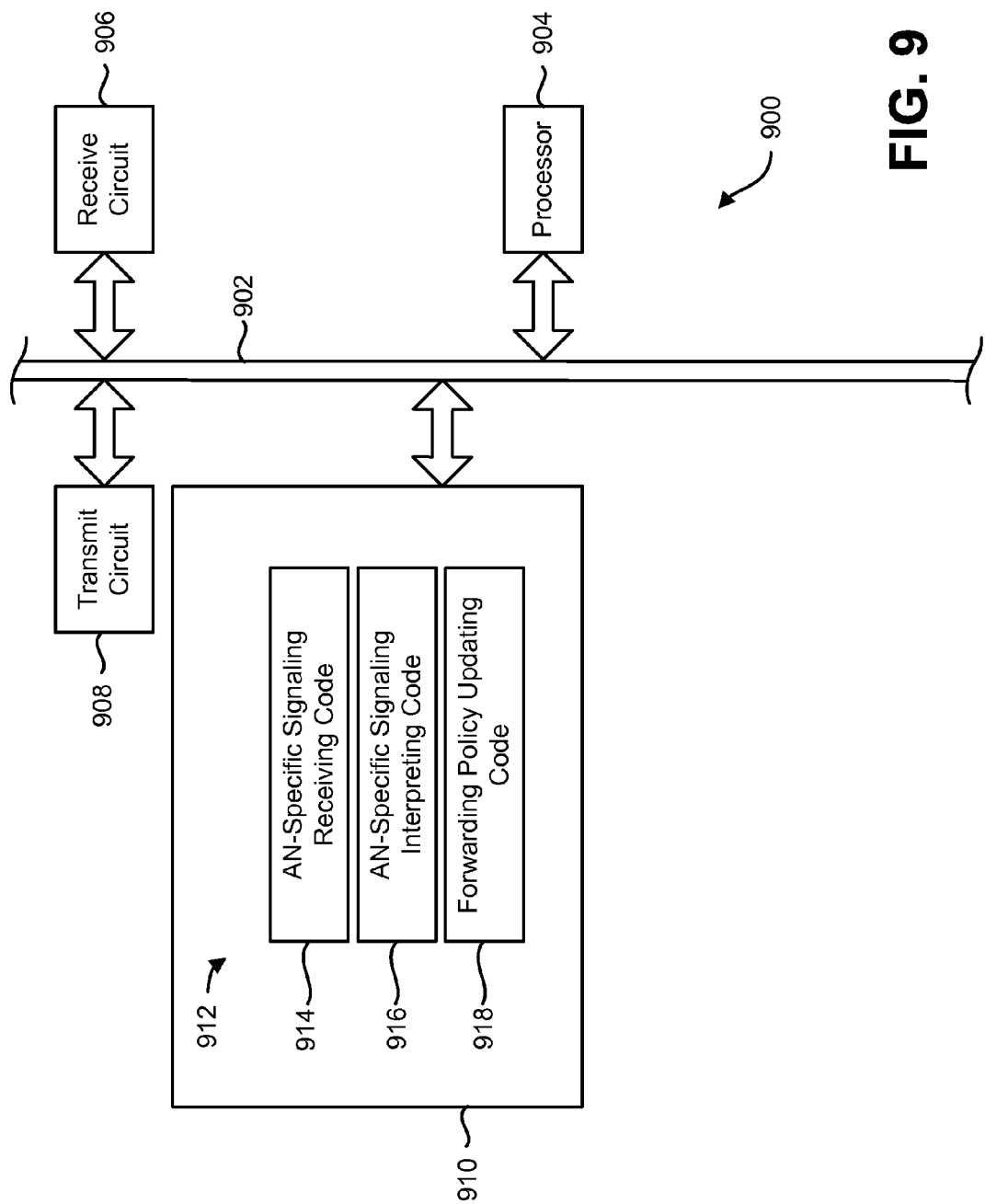

mobile node.

METHODS AND APPARATUS FOR FACILITATING NETWORK-BASED CONTROL OF A FORWARDING POLICY USED BY A MOBILE NODE

RELATED APPLICATIONS

This application is related to and claims priority from U.S. patent application Ser. No. 61/060,078, filed Jun. 9, 2008, for "Net-Based QoS Controlled Forwarding Policy for Multiple Uplinks," which is incorporated herein by reference.

TECHNICAL FIELD

The present disclosure relates generally to wireless communication systems. More specifically, the present disclosure relates to wireless communication systems that implement communication protocols that are related to facilitating mobility, such as Mobile IP (Internet Protocol), Proxy Mobile IP, etc.

BACKGROUND

A wireless communication system normally provides communication for a number of mobile devices, each of which may be serviced by a base station.

Mobile IP is a communications protocol that is designed to allow mobile device users to move from one network to another while maintaining a permanent IP address. Mobile IP may be found in wireless environments where users carry their mobile devices across multiple access networks. For example, Mobile IP may be used in roaming between overlapping wireless systems, e.g., IP over wireless LAN (WLAN), High Rate Packet Data (HRPD), Long Term Evolution (LTE), etc. In the context of Mobile IP, a mobile device may be referred to as a mobile node.

The most recent version of Mobile IP is Mobile IP version 6 (MIPv6). In accordance with MIPv6, when a mobile node leaves one access network and connects to another access network (referred to herein as the new access network), it receives a care-of address from the new access network. The mobile node then sends a binding update to its home agent, which is at a fixed place in the Internet (e.g., at the mobile node's home network). The binding update causes the home agent to bind the mobile node's home address with its current care-of address. Packets sent to the mobile node's home address are routed to the home agent, and the home agent tunnels those packets to the mobile node's care-of address.

Proxy MIPv6 (PMIPv6) is a variant of MIPv6 where the mobile node is not involved in the signaling. PMIPv6 uses mobility access gateways in the network to proxy MIPv6 signaling on behalf of the mobile node, as the mobile node moves from one mobility access gateway to the next. The mobile node's home network includes a local mobility anchor, which is similar to the home agent in MIPv6. When a mobile node leaves one access network, it attaches to a new access network and a corresponding mobility access gateway. The new mobility access gateway sends a proxy binding update to the local mobility anchor, which binds the mobile node's home address with its current mobility access gateway. Packets sent to the mobile node's home address are routed to the local mobility anchor, and the local mobility anchor tunnels those packets to the mobility access gateway. The mobility access gateway then delivers the packets to the mobile node.

BRIEF DESCRIPTION OF THE DRAWINGS

FIG. 9 shows part of a hardware implementation of an apparatus that is configured to facilitate network-based control of a forwarding policy used by a mobile node.

DETAILED DESCRIPTION

Figure 1:
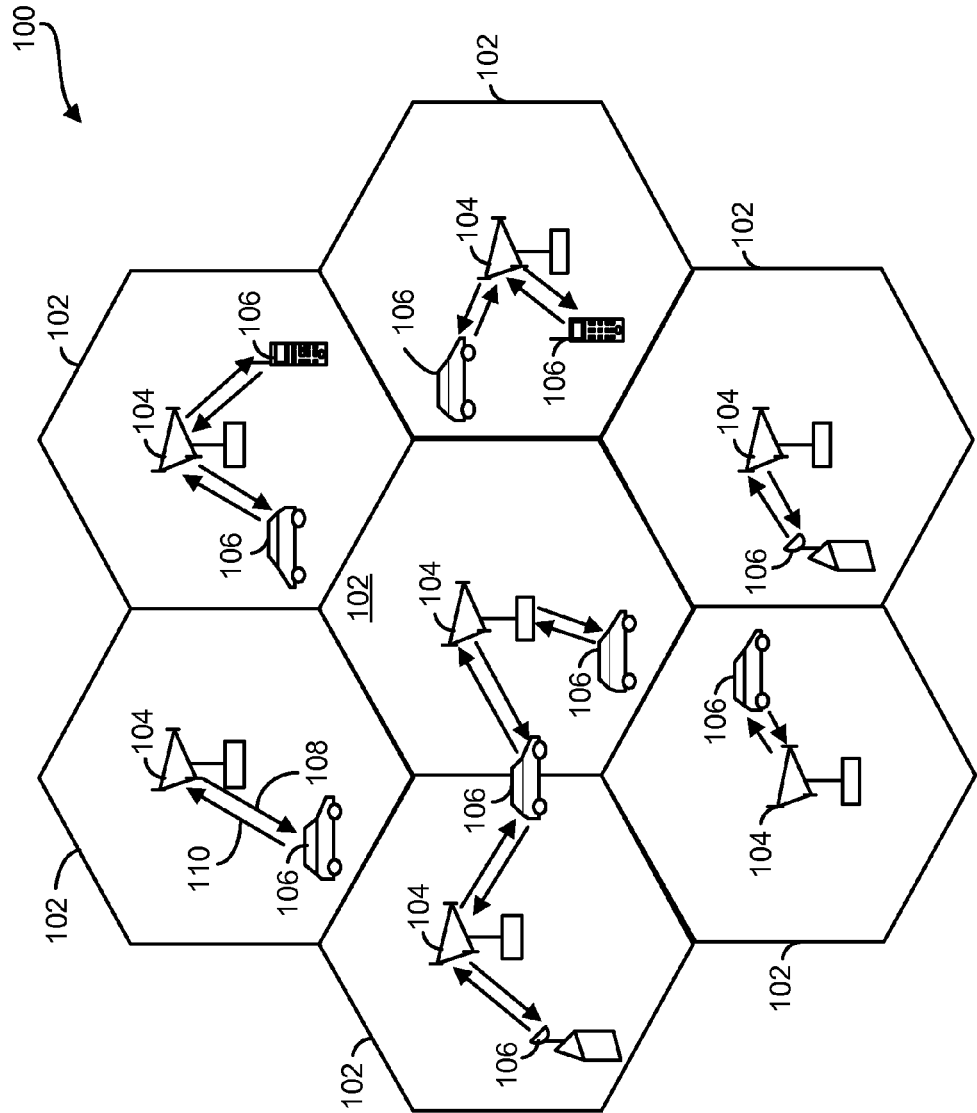
FIG. 1 illustrates a wireless communication system.

A mobile node that is configured to facilitate network-based control of a forwarding policy is disclosed. The mobile node includes a processor and circuitry coupled to the processor. The circuitry is configured to receive access network-specific signaling that is related to an Internet Protocol (IP) flow. The circuitry is also configured to decide which of multiple access networks to use to send the IP flow based on the access network-specific signaling.

The access network-specific signaling may be received from an access network. The access network-specific signaling may include a request to set up quality of service (QoS) for the IP flow on the said access network. Alternatively, the access network-specific signaling may include a bearer establishment message for the IP flow on the said access network. Alternatively still, the access network-specific signaling may include a bearer modification message for the IP flow on the said access network.

Deciding which of the multiple access networks to use may include updating a forwarding policy at the mobile node. More specifically, deciding which of the multiple access networks to use may include interpreting the access network-specific signaling as a command to send the IP flow over the access network from which the access network-specific signaling was received, and updating a forwarding policy at the mobile node to indicate that the IP flow should be sent over the access network from which the access network-specific signaling was received.

The access-network specific signaling may include a bearer release message. In this case, deciding which of the multiple access networks to use may include interpreting the bearer release message as a command to move the IP flow to another access network.

The access-network specific signaling may include a bearer modification message that causes a bearer to be modified so that its Traffic Flow Template (TFT) no longer covers the IP flow. In this case, deciding which of the multiple access networks to use may include interpreting the bearer modification message as a command to move the IP flow to another access network.

The circuitry may also be configured to access the multiple access networks at the same time. The access network-specific signaling may be received from an access gateway in an access network.

A method for facilitating network-based control of a forwarding policy is disclosed. A mobile node receives access network-specific signaling that is related to an Internet Protocol (IP) flow. The mobile node decides which of multiple access networks to use to send the IP flow based on the access network-specific signaling.

An apparatus for facilitating network-based control of a forwarding policy is also disclosed. The apparatus includes means for receiving access network-specific signaling that is related to an Internet Protocol (IP) flow. The apparatus also includes means for deciding which of multiple access networks to use to send the IP flow based on the access network-specific signaling.

A computer-program product for facilitating network-based control of a forwarding policy is also disclosed. The computer-program product includes a computer-readable medium having instructions thereon. The instructions include code for receiving access network-specific signaling that is related to an Internet Protocol (IP) flow. The instructions also include code for deciding which of multiple access networks to use to send the IP flow based on the access network-specific signaling.

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA), and other systems. The terms "system" and "network" may be used interchangeably herein. A CDMA system can implement a radio technology such as Universal Terrestrial Radio Access (UTRA), CDMA2000, etc. UTRA includes Wideband-CDMA (W-CDMA) and other variants of CDMA. CDMA2000 covers the IS-2000, IS-95, and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

FIG. 1 illustrates a wireless communication system 100. The system 100 provides communication for multiple cells 102, with each cell 102 being serviced by a corresponding base station 104. A base station 104 may be a fixed station that communicates with mobile stations 106. A base station 104 may alternatively be referred to as an access point, a Node B, or some other terminology.

One or more mobile stations 106 may be dispersed within the system 100 over time. The mobile stations 106 may alternatively be referred to as remote stations, access terminals, terminals, subscriber units, user equipment, mobile nodes, etc. The mobile stations 106 may be wireless devices, such as cellular phones, smart phones, personal digital assistants (PDAs), handheld communication devices, wireless modems, laptop computers, or any other suitable device for communicating over the system 100.

A communication link that facilitates transmission from a BS 104 to an MS 106 may be referred to as a downlink 108, and a communication link that facilitates transmission from an MS 106 to a BS 104 may be referred to as an uplink 110. Alternatively, a downlink 108 may be referred to as a forward link or a forward channel, and an uplink 110 may be referred to as a reverse link or a reverse channel. In a frequency division duplex (FDD) system, a downlink 108 can utilize a different frequency band than that used by an uplink 110. In a time division duplex (TDD) system, a downlink 108 and an uplink 110 can utilize a common frequency band.

Figure 2:
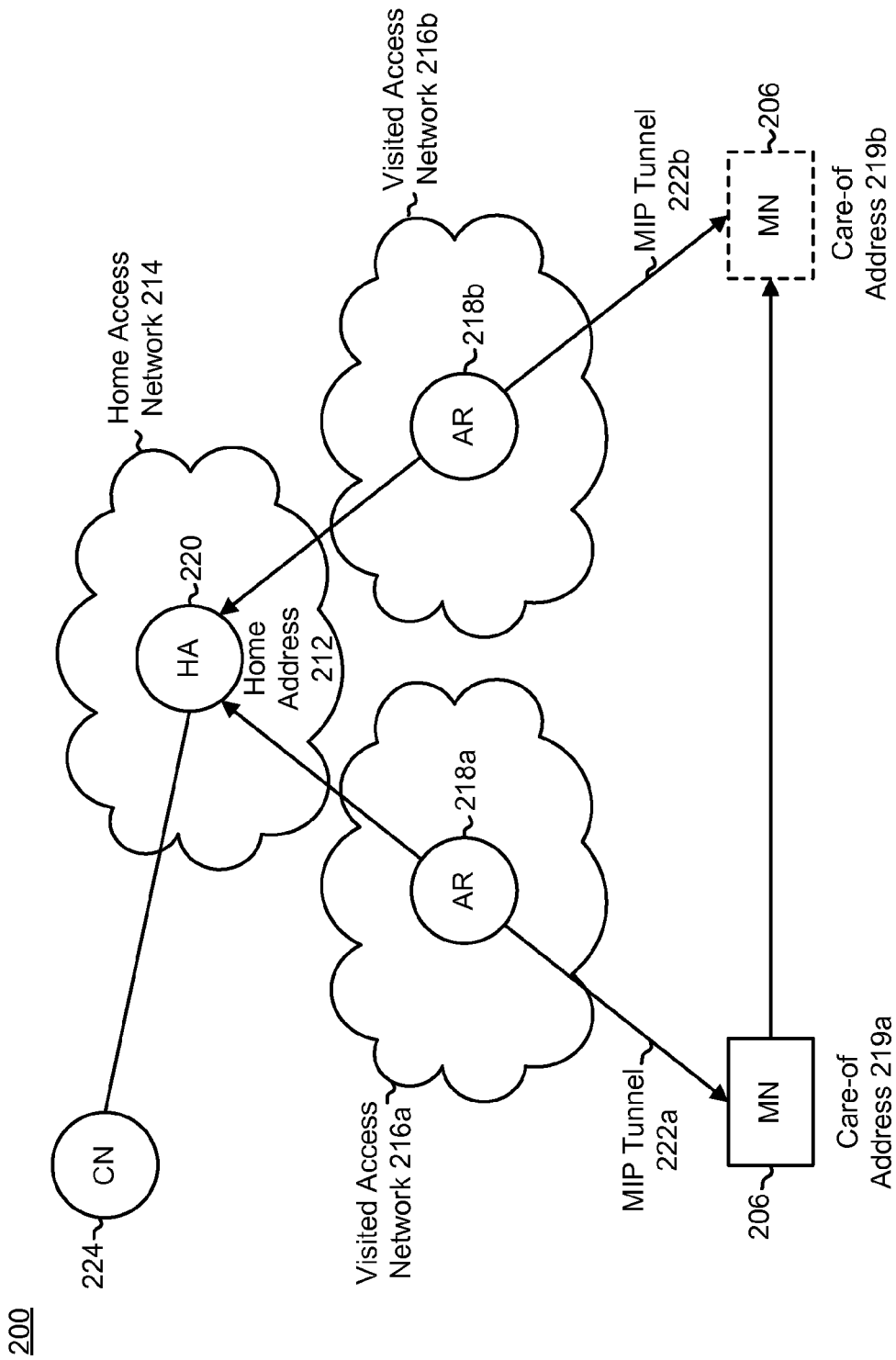
FIG. 2 illustrates a system that operates in accordance with Mobile IP version 6 (MIPv6)

FIG. 2 illustrates a system 200 that operates in accordance with Mobile IP version 6 (MIPv6). In accordance with MIPv6, a mobile node 206 is assigned a permanent home address 212, which is an IP address that is associated with the mobile node's 206 home access network 214.

The mobile node 206 may leave its home access network 214 and travel to a visited access network 216a. The visited access network 216a includes an access router 218a. The access router 218a assigns the mobile node 206 a care-of address 219a. The mobile node 206 sends a binding update to a home agent 220 at the home access network 214, which binds the home address 212 to its care-of address 219a. An MIP tunnel 222a is established between the home agent 220 and the mobile node 206. When a corresponding node 224 sends a packet to the mobile node 206, the destination address of the packet is the home address 212 of the mobile node 206. The packet is routed to the home agent 220, which then tunnels the packet to the mobile node 206.

The mobile node 206 may leave the visited access network 216a and travel to another visited access network 216b. The visited access network 216b also includes an access router 218b. The second access router 218b assigns the mobile node 206 a second care-of address 219b. The mobile node 206 sends a second binding update to the home agent 220, which binds the home address 212 to the second care-of address 219b. An MIP tunnel 222b is established between the home agent 220 and the mobile node 206. When a corresponding node 224 sends a packet to the home address 212 of the mobile node 206, the packet is routed to the home agent 220, which then tunnels the packet to the mobile node 206 via the MIP tunnel 222b.

Figure 3:
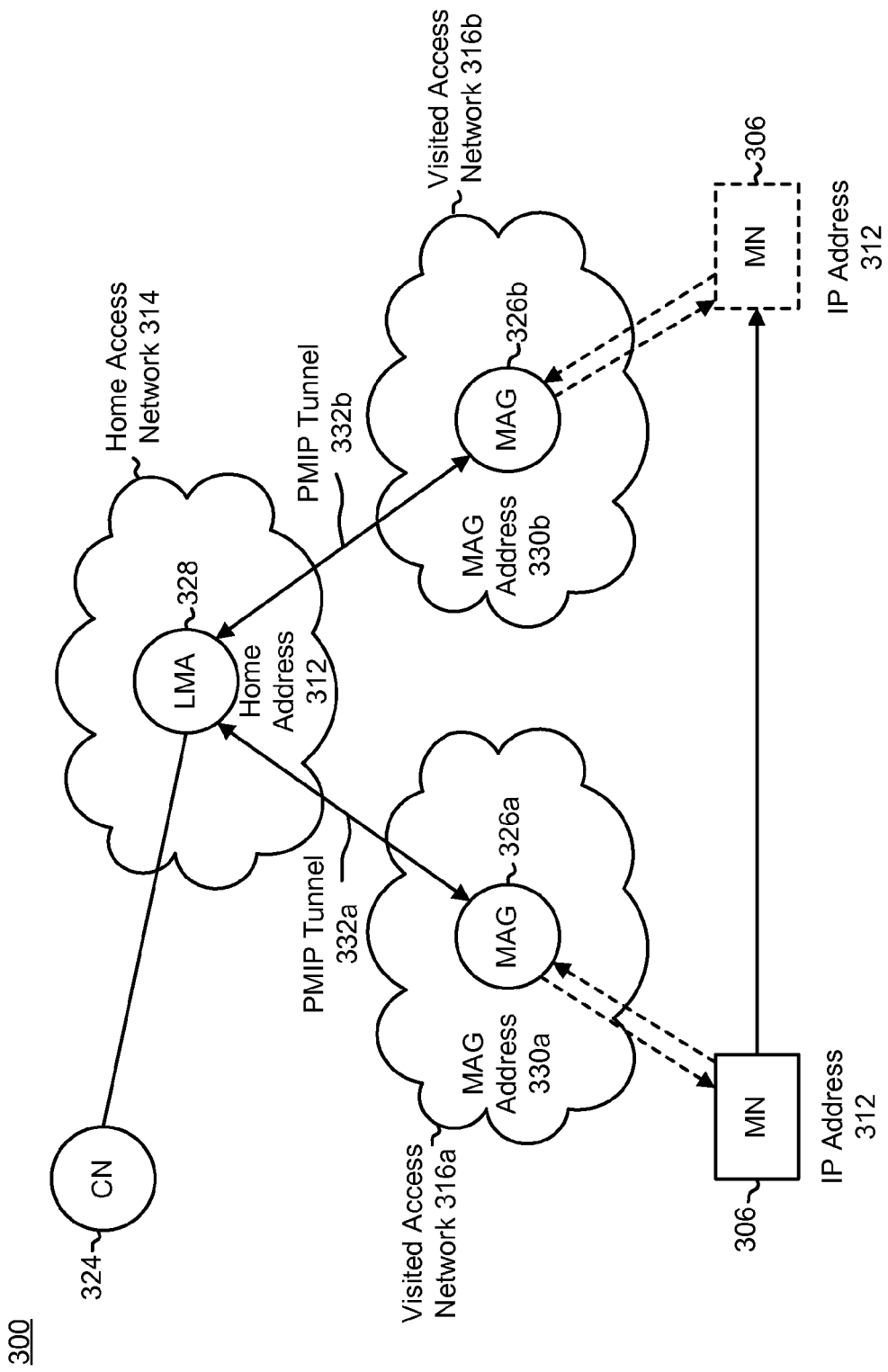
FIG. 3 illustrates a system that operates in accordance with Proxy Mobile IP version 6 (PMIPv6)

FIG. 3 illustrates a system 300 that operates in accordance with Proxy Mobile IP version 6 (PMIPv6). PMIPv6 uses mobility access gateways 326 to proxy mobility management signaling on behalf of a mobile node 306, as the mobile node 306 moves from one mobility access gateway 326 to the next. When a mobile node 306 leaves its home access network 314 and travels to a visited access network 316a, the mobility access gateway 326a for the visited access network 316a sends a proxy binding update to a local mobility anchor 328 in the home access network 314, which binds the home address 312 of the mobile node 306 with the address 330a of the mobility access gateway 326a. A PMIP tunnel 332a is established between the local mobility anchor 328 and the mobility access gateway 326a. When a corresponding node 324 sends a packet to the home address 312 of the mobile node 306, the packet is routed to the local mobility anchor 328, which then tunnels the packet to the mobility access gateway 326a via the PMIP tunnel 332a. The mobility access gateway 326a then delivers the packet to the mobile node 306.

When the mobile node 306 leaves the visited access network 316a and travels to another visited access network 316b, the mobility access gateway 326b for the new visited access network 316b sends another proxy binding update to the local mobility anchor 328, which binds the home address 312 of the mobile node 306 with the address 330b of the mobility access gateway 326b. A PMIP tunnel 332b is established between the local mobility anchor 328 and the mobility access gateway 326b. When a corresponding node 324 sends a packet to the home address 312 of the mobile node 306, the packet is routed to the local mobility anchor 328, which then tunnels the packet to the mobility access gateway 326*b* via the PMIP tunnel 332*b*. The mobility access gateway 326*b* then delivers the packet to the mobile node 306.

Figure 4:
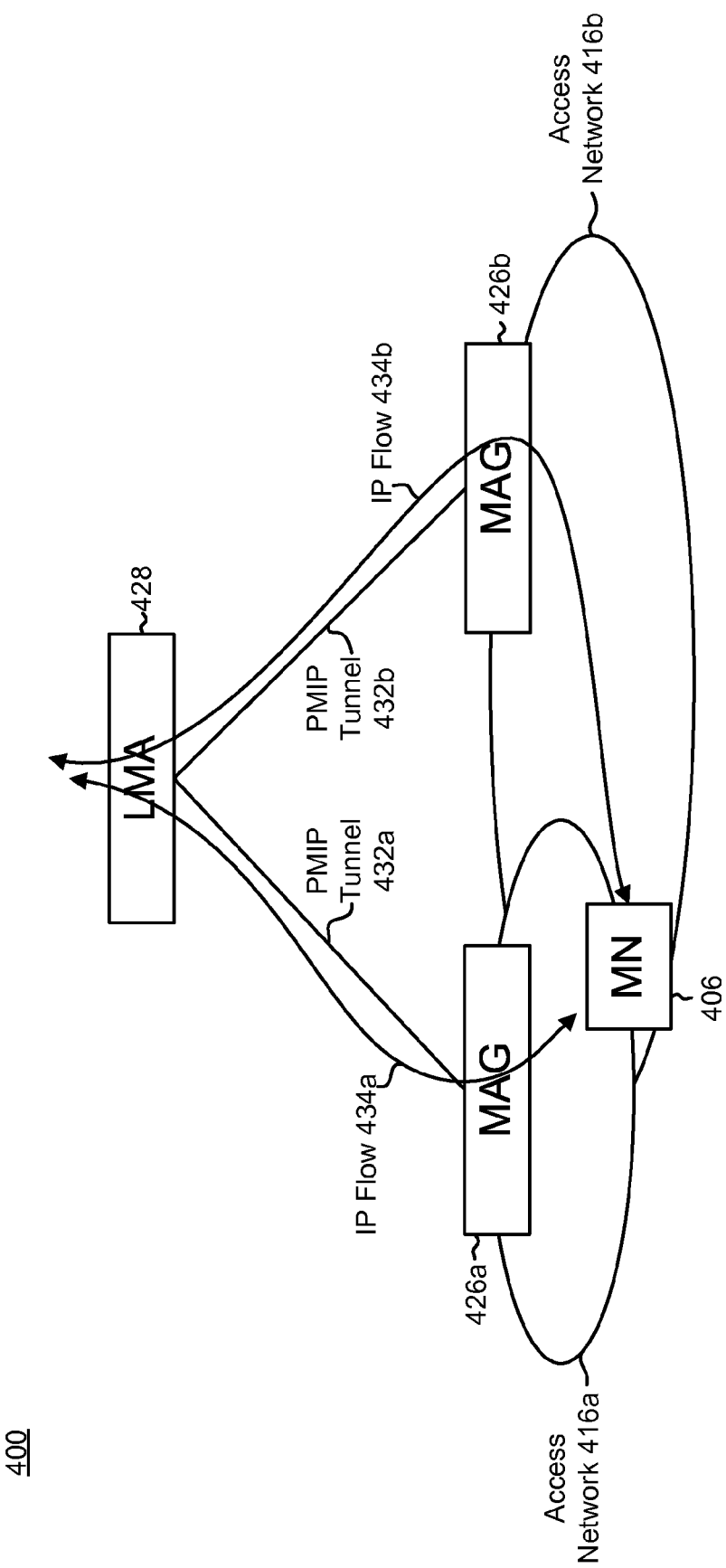
FIG. 4 illustrates a system that operates in accordance with PMIPv6, where a mobile node is capable of accessing a first access network and a second access network at the same time.

FIG. 4 illustrates a system 400 that operates in accordance with PMIPv6, where a mobile node 406 is capable of accessing a first access network 416*a* and a second access network 416*b* at the same time. Stated another way, it may be said that the mobile node 406 has multiple downlinks and uplinks. For example, the first access network 416*a* may be a wireless local area network, and the second access network 416*b* may be a high rate packet data (HRPD) network. As another example, the first access network 416*a* may be a wireless local area network, and the second access network 416*b* may be a long term evolution (LTE) network. The first access network 416*a* and the second access network 416*b* may utilize different frequencies, and the mobile node 406 may utilize different radios to access the different access networks 416*a*, 416*b*.

A PMIP tunnel 432*a* is established between a local mobility anchor 428 and a mobility access gateway 426*a* in the first access network 416*a*, and a PMIP tunnel 432*b* is established between the local mobility anchor 428 and a mobility access gateway 426*b* in the second access network 416*b*.

There may be multiple applications running on the mobile node 406, such as voice, video, file download, email, etc. Therefore, there may be multiple IP flows 434 being sent to/from the mobile node 406. As used herein, the term "IP flow" may refer to a sequence of IP packets with the same header information, for example, the same 5-tuple including source and destination IP addresses, source and destination ports, and the same transport protocol. It should be understood that there are other ways to identify IP flows as well, for example, using an IPv6 flow label, or an SPI (Security Parameter Index) in IPsec headers. The mechanisms described in this application apply irrespective of how an IP flow is being identified. Two IP flows 434*a*, 434*b* are shown in the system 400 of FIG. 4. Different IP flows 434 may be sent/received via different access networks 416. For example, the first IP flow 434*a* may be sent/received via the first access network 416*a*, and the second IP flow 434*b* may be sent/received via the second access network 416*b*.

Figure 5:
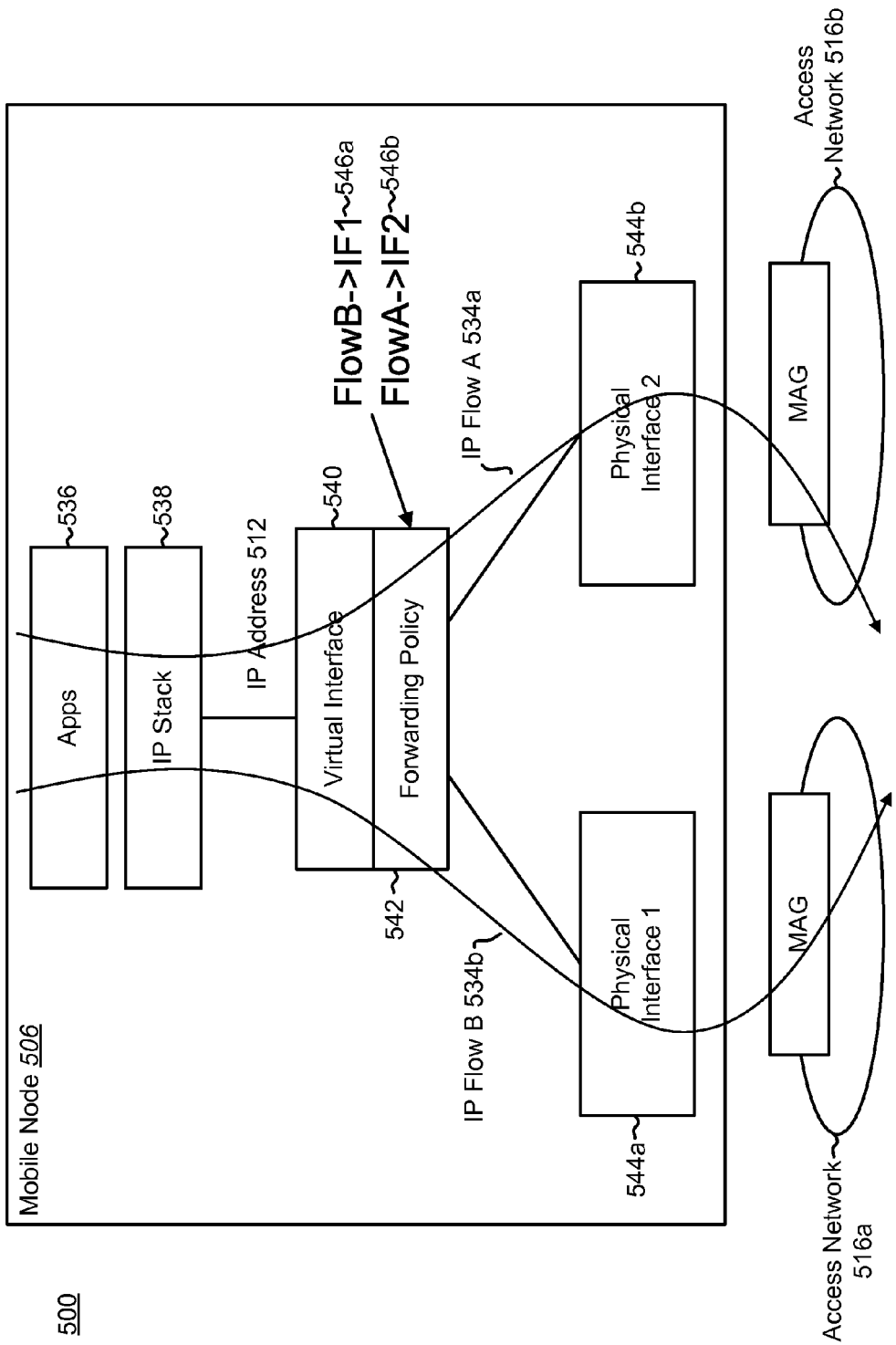
FIG. 5 illustrates another system that operates in accordance with PMIPv6, where a mobile node is capable of accessing a first access network and a second access network at the same time.

FIG. 5 illustrates another system 500 that operates in accordance with PMIPv6, where a mobile node 506 is capable of accessing a first access network 516*a* and a second access network 516*b* at the same time. Multiple applications 536 may run on the mobile node 506, including voice, video, file download, email, etc. The mobile node 506 also includes an IP stack 538, which is a set of components that implement the Internet protocol (IP).

The mobile node 506 also includes a virtual interface 540 and multiple physical interfaces 544*a*, 544*b*. The virtual interface 540 is associated with an IP address 512. However, neither of the physical interfaces 544*a*, 544*b* are associated with an IP address. The first physical interface 544*a* is utilized to send data to a first access network 516*a*, and the second physical interface 544*b* is utilized to send data to a second access network 516*b*.

For uplink transmissions, the IP stack 538 sends packets that are generated by the applications 536 to the virtual interface 540. The virtual interface 540 includes a forwarding policy 542. The forwarding policy 542 indicates which of the multiple physical interfaces 544 are to be used to send the packets to their ultimate destination. For example, the forwarding policy 542 may include an indication 546*a* that packets corresponding to IP flow B 534*b* are to be sent via a first physical interface 544*a*. The forwarding policy 542 may also include an indication 546*b* that packets corresponding to IP flow A 534*a* are to be sent via a second physical interface 544*b*. The virtual interface 540 sends packets corresponding to the different IP flows 534*a*, 534*b* to the appropriate physical interfaces 544*a*, 544*b* based on the forwarding policy 542.

When a mobile node 506 uses a virtual interface 540 with multiple unnumbered physical interfaces 544 (i.e., physical interfaces 544 with no IP address associated with them), as in PMIP/GTP type networks, there is no way to instruct the forwarding policy 542 of the mobile node 506 how to forward IP flows 534 between available physical interfaces 544. In other words, mobility access gateways 326 and other core network entities providing mobility management have no control over how the mobile node 506 uses available uplinks.

Figure 6:
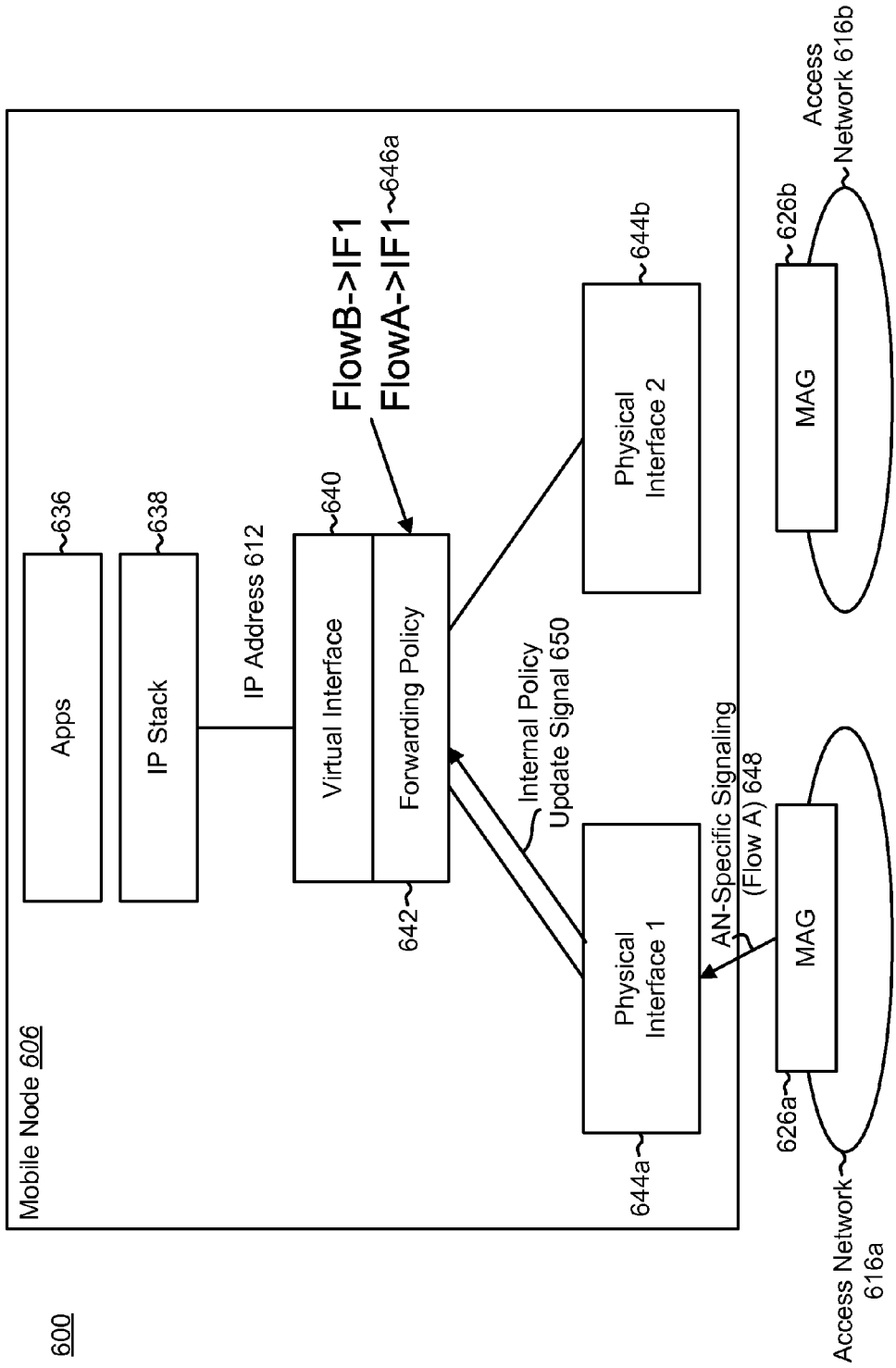
FIGS. 6 and 7 illustrate a system that is configured to facilitate network-based control of a forwarding policy used by a mobile node.
Figure 7:
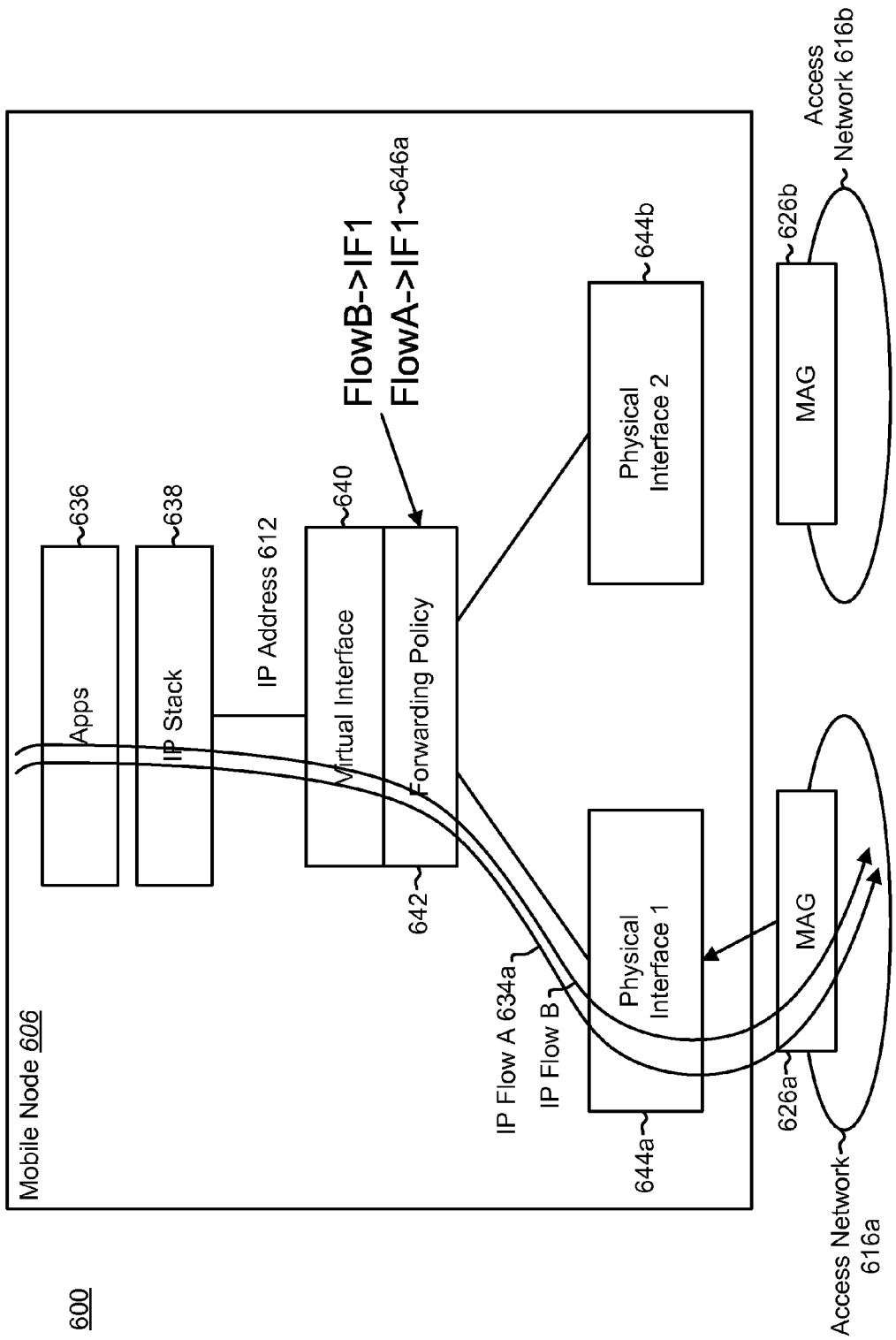

FIGS. 6 and 7 illustrate a system 600 that is configured to facilitate network-based control of a forwarding policy used by a mobile node 606. The mobile node 606 is similar in some respects to the mobile node 506 shown in FIG. 5. In particular, the mobile node 606 includes multiple applications 636, an IP stack 638, a virtual interface 640 (with an associated IP address 612), and multiple physical interfaces 644*a*, 644*b*. The first physical interface 644*a* is utilized to send data to a first access network 616*a*, and the second physical interface 644*b* is utilized to send data to a second access network 616*b*.

As shown in FIG. 6, the mobile node 606 may receive access network-specific signaling 648 that is related to a particular IP flow 634 (e.g., IP flow A 634*a* in FIG. 7). The access network-specific signaling 648 may be received from an access network 616*a*, for example, from a mobility access gateway 626*a* in the access network 616*a*.

As used herein, the phrase "access network-specific signaling" refers to signaling that is related to the interaction between a mobile node 606 and a specific access network (e.g., the first access network 616*a*), and the format of the signaling often depends on the access network. For example, the access-network specific signaling 648 may include a request to set up quality of service (QoS) for a particular IP flow 634. Such a request may be sent to the mobile node 606 for the purpose of setting up resources with a certain QoS (e.g., to guarantee a certain bit rate, delay, jitter, packet dropping probability, bit error rate, etc.) that will be used to carry the IP flow 634.

As another example, the access-network specific signaling 648 may include a bearer establishment message for a particular IP flow 634. Before a mobile node 606 can send an IP packet to the network, the network sets up a bearer to the mobile node 606. This involves sending a bearer establishment message to the mobile node 606. For example, in an LTE network, the bearer establishment message may correspond to the default or dedicated bearer activation messages such as ACTIVATE DEFAULT EPS BEARER CONTEXT REQUEST or ACTIVATE DEDICATED EPS BEARER CONTEXT REQUEST messages (where EPS stands for Evolved Packet System). These messages contain TFT (Traffic Flow Template) information that includes the packet filters for the IP flow 634. The mobile node 606 may interpret the access network-specific signaling 648 as a command to send the IP flow 634*a* over the access network 616*a* from which the access network-specific signaling 648 was received.

As another example, the access-network specific signaling 648 may include a bearer modification message for a particular IP flow 634. The bearer for a particular mobile node 606 can be altered. This involves sending a bearer modification message to the mobile node 606. For example, in an LTE network, the bearer modification message may correspond to the EPS bearer context modification messages such as a MODIFY EPS BEARER CONTEXT REQUEST message. These messages contain TFT information that includes the packet filters for the IP flow 634 so the modified bearer is allowed to carry the IP flow 634.

As yet another example, the access-network specific signaling 648 may include a bearer release message or a bearer modification message for a particular IP flow 634. For example, in an LTE network, the bearer release message may correspond to the EPS bearer deactivation messages such as the DEACTIVATE EPS BEARER CONTEXT REQUEST message and the bearer modification message may correspond to the EPS bearer context modification messages such as the MODIFY EPS BEARER CONTEXT REQUEST message. As a result of these messages, either the bearer for carrying the IP flow 634 is released or the updated TFT for the modified bearer no longer covers the IP flow 634. The main difference from the previous examples is that since the resources for the IP flow 634 have been removed from the access network 616a, then the mobile node 606 may interpret this as a command to move the IP flow 634 to the other access network 616b where a best effort bearer may exist for all IP flows.

In response to receiving the access network-specific signaling 648 for a particular IP flow 634a, the mobile node 606 decides which of multiple access networks 616a, 616b to use to send the IP flow 634a based on the access network-specific signaling 648. For example, the mobile node 606 may interpret the access network-specific signaling 648 as a command to send the IP flow 634a over the access network 616a from which the access network-specific signaling 648 was received. The mobile node 606 may then update the forwarding policy 642 at the mobile node 606 to indicate that the IP flow 634a should be sent over the access network 616a from which the access network-specific signaling 648 was received. This may be accomplished via an internal policy update signal 650, which may be sent from the access network specific handling functions over the physical interface 644a to the function for deriving forwarding policy 642.

After the forwarding policy 642 is updated, the forwarding policy 642 may include an indication 646a that packets corresponding to IP flow A 634a are to be sent via the first physical interface 644a. Thereafter, the virtual interface 640 sends packets corresponding to IP flow A 634a to the first access network 616a via the first physical interface 644a, as specified in the forwarding policy 642. This is shown in FIG. 7.

After an IP flow 634 has been associated with a particular physical interface 644 and is being sent through a particular access network 616, a decision may be made by one or more network entities to move the IP flow 634 to a different access network 616. For example, after IP flow A 634a has been associated with the first physical interface 644a and is being sent through the first access network 616a, a decision may subsequently be made to move IP flow A 634a to the second access network 616b. This may be accomplished by having the second access network 616b, for example, the mobility access gateway 626b, send access-network specific signaling related to IP flow A 634a to the mobile node 606. (This is not shown in the figures.)

Figure 8:
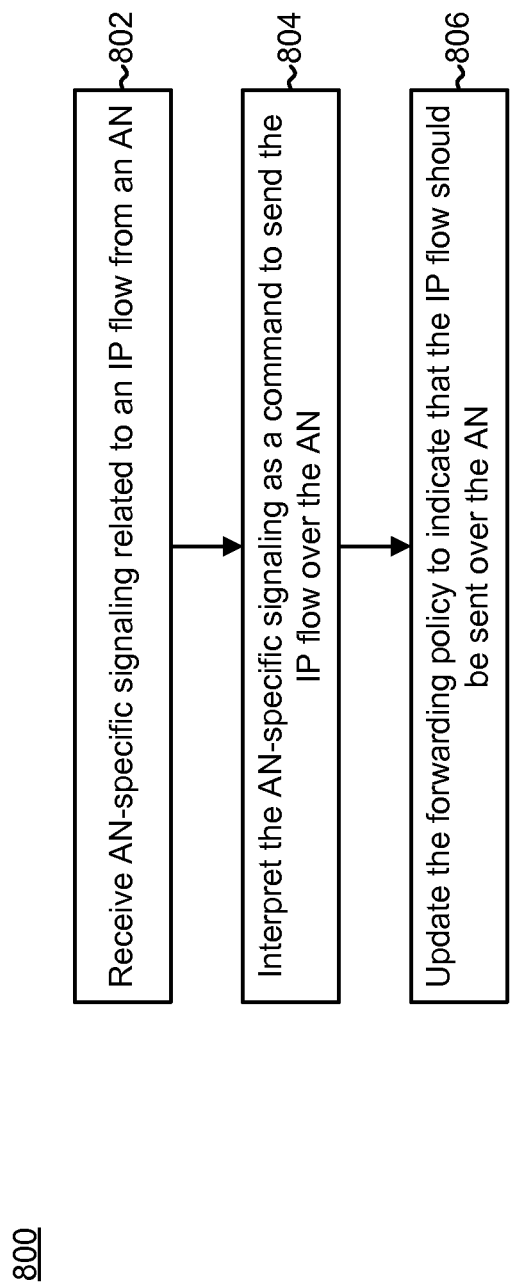
FIG. 8 illustrates a method for facilitating network-based control of a forwarding policy used by a mobile node.

FIG. 8 is a flow chart which illustrates a method 800 for facilitating network-based control of a forwarding policy used by a mobile node 606. The mobile node 606 may receive 802 access network-specific signaling 648 that is related to a particular IP flow 634a. The access network-specific signaling 648 may be received from an access network 616a, for example, from a mobility access gateway 626a in the access network 616a. The access-network specific signaling 648 may include a request to set up quality of service (QoS) for the IP flow 634a over the access network 616a. As another example, the access-network specific signaling 648 may include a bearer establishment message for the IP flow 634a. As another example, the access-network specific signaling 648 may include a bearer modification message for the IP flow 634a.

In response to receiving 802 the access network-specific signaling 648 for a particular IP flow 634a, the mobile node 606 decides which of multiple access networks 616a, 616b to use to send the IP flow 634a based on the access network-specific signaling 648. For example, the mobile node 606 may interpret 804 the access network-specific signaling 648 as a command to send the IP flow 634a over the access network 616a from which the access network-specific signaling 648 was received. The mobile node 606 may then update 806 the forwarding policy 642 at the mobile node 606 to indicate that the IP flow 634a should be sent over the access network 616a from which the access network-specific signaling 648 was received.

Even though the present methods and apparatus has been described in terms of PMIP, it should be understood that the same mechanisms can be used for any network-based mobility mechanisms, including GTP based networks (GTP stands for the GPRS Tunneling Protocol, and GPRS stands for the General Packet Radio Service).

FIG. 9 shows part of a hardware implementation of an apparatus 900 that is configured to facilitate network-based control of a forwarding policy used by a mobile node. The circuit apparatus is signified by the reference numeral 900 and may be implemented in a network entity (e.g., a mobile node 606).

The apparatus 900 comprises a central data bus 902 linking several circuits together. The circuits include a processor 904, a receive circuit 906, a transmit circuit 908, and memory 910. The memory 910 is in electronic communication with the processor 904, i.e., the processor 904 can read information from and/or write information to the memory 910.

The processor 904 may be a general purpose processor, a central processing unit (CPU), a microprocessor, a digital signal processor (DSP), a controller, a microcontroller, a state machine, an application specific integrated circuit (ASIC), a programmable logic device (PLD), a field programmable gate array (FPGA), etc. The processor 904 may include a combination of processing devices, e.g., a combination of a DSP and a microprocessor, a plurality of microprocessors, one or more microprocessors in conjunction with a DSP core, or any other such configuration.

The receive circuit 906 and the transmit circuit 908 can be connected to an RF (Radio Frequency) circuit, but that is not shown in the drawing. The receive circuit 906 may process and buffer received signals before sending the signals out to the data bus 902. On the other hand, the transmit circuit 908 may process and buffer the data from the data bus 902 before sending the data out of the device 900. The processor 904 may perform the function of data management of the data bus 902 and further the function of general data processing, including executing the instructional contents of the memory 910.

Instead of separately disposed as shown in FIG. 9, as an alternative, the transmit circuit 908 and the receive circuit 906 may be implemented in the processor 904.

The memory unit 910 includes a set of instructions generally signified by the reference numeral 912. The instructions 912 may be executable by the processor 904 to implement the methods described herein. The instructions 912 may include code 914 for receiving access network-specific signaling 648 that is related to a particular IP flow 634a from an access network 616a. The instructions 912 may also include code 916 for interpreting the access network-specific signaling 648 as a command to send the IP flow 634a over the access network 616a from which the access network-specific signaling 648 was received. The instructions 912 may also include code 918 for updating the forwarding policy 642 at the mobile node 606 to indicate that the IP flow 634a should be sent over the access network 616a from which the access network-specific signaling 648 was received.

The instructions 912 shown in the memory 910 may comprise any type of computer-readable statement(s). For example, the instructions 912 in the memory 910 may refer to one or more programs, routines, sub-routines, modules, functions, procedures, data sets, etc. The instructions 912 may comprise a single computer-readable statement or many computer-readable statements.

The memory 910 may be a RAM (Random Access Memory) circuit. The memory 910 can be tied to another memory circuit (not shown) which can either be of the volatile or nonvolatile type. As an alternative, the memory 910 can be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, combinations thereof, and others well known in the art. The memory 910 may be considered to be an example of a computer-program product that comprises a computer-readable medium with instructions 912 stored therein.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. An apparatus for facilitating network-based control of a forwarding policy, comprising:
    means for receiving access network-specific signaling that is related to an Internet Protocol (IP) flow; and
    means for deciding which of a plurality of physical interfaces within a mobile node that are respectively associated with multiple access networks to use to send the IP flow via an uplink communication link from the mobile node based on the access network-specific signaling when the physical interfaces within the mobile node have no associated IP addresses,
    wherein the access-network specific signaling comprises a bearer modification message that causes a bearer to be modified so that a Traffic Flow Template (TFT) no longer covers the IP flow, and wherein said
    means for deciding which of the plurality of physical interfaces within a mobile node that are respectively associated with the multiple access networks to use comprises means for interpreting the bearer modification message as a command to move the IP flow to another access network.

2. The apparatus of claim 1, wherein the access network-specific signaling comprises a request to set up quality of service (QoS) for the IP flow on the said access network.

3. The apparatus of claim 1, wherein the access network-specific signaling comprises a bearer establishment message for the IP flow on the said access network.

4. The apparatus of claim 1, wherein the access network-specific signaling comprises a bearer modification message for the IP flow on the said access network.

5. The apparatus of claim 1, wherein the means for deciding which of the plurality of physical interfaces within a mobile node that are respectively associated with the multiple access networks to use comprises means for updating the forwarding policy at the mobile node.

6. The apparatus of claim 1, wherein the access network-specific signaling is received from an access network, and wherein the means for deciding which of the plurality of physical interfaces within a mobile node that are respectively associated with the multiple access networks to use comprises: means for interpreting the access network-specific signaling as a command to send the IP flow over the access network from which the access network-specific signaling was received; and means for updating the forwarding policy at the mobile node to indicate that the IP flow should be sent over the access network from which the access network-specific signaling was received.

7. The apparatus of claim 1, wherein the access-network specific signaling comprises a bearer release message, and wherein the means for deciding which of the plurality of physical interfaces within a mobile node that are respectively associated with the multiple access networks to use comprises means for interpreting the bearer release message as a command to move the IP flow to another access network.

8. The apparatus of claim 1, further comprising means for accessing the multiple access networks at the same time.

9. The apparatus of claim 1, wherein the access network-specific signaling is received from an access gateway in an access network.

10. A mobile node configured to facilitate network-based control of a forwarding policy, comprising:

receiver circuitry configured to receive access network-specific signaling that is related to an Internet Protocol (IP) flow;

a memory; and a processor coupled to the memory and the receiver circuitry, wherein the processor is configured with process-executable instructions to perform operations comprising:

deciding which of a plurality of physical interfaces within the mobile node that are respectively associated with multiple access networks to use to send the IP flow via an uplink communication link from the mobile node based on the access network-specific signaling when the physical interfaces within the mobile node have no associated IP addresses, wherein the access-network specific signaling comprises a bearer modification message that causes a bearer to be modified so that a Traffic Flow Template (TFT) no longer covers the IP flow, and wherein said deciding which of the plurality of physical interfaces within a mobile node that are respectively associated with the multiple access networks to use comprises means for interpreting the bearer modification message as a command to move the IP flow to another access network.

11. The mobile node of claim 10, wherein the processor is configured with processor-executable instructions to perform operations such that: the access network-specific signaling is received from an access network; and the access network-specific signaling comprises a request to set up quality of service (QoS) for the IP flow on the said access network.

12. The mobile node of claim 10, wherein the processor is configured with processor-executable instructions to perform operations such that: the access network-specific signaling is received from an access network; and the access network-specific signaling comprises a bearer establishment message for the IP flow on the said access network.

13. The mobile node of claim 10, wherein the processor is configured with processor-executable instructions to perform operations such that: the access network-specific signaling is received from an access network; and the access network-specific signaling comprises a bearer modification message for the IP flow on the said access network.

14. The mobile node of claim 10, wherein the processor is configured with processor-executable instructions to perform operations such that deciding which of the plurality of physical interfaces within a mobile node that are respectively associated with the multiple access networks to use comprises updating the forwarding policy at the mobile node.

15. The mobile node of claim 10, wherein the processor is configured with processor-executable instructions to perform operations such that: the access network-specific signaling is received from an access network; and deciding which of the plurality of physical interfaces within a mobile node that are respectively associated with the multiple access networks to use comprises: interpreting the access network-specific signaling as a command to send the IP flow over the access network from which the access network-specific signaling was received; and updating the forwarding policy at the mobile node to indicate that the IP flow should be sent over the access network from which the access network-specific signaling was received.

16. The mobile node of claim 10, wherein the processor is configured with processor-executable instructions to perform operations such that: the access-network specific signaling comprises a bearer release message; and deciding which of the plurality of physical interfaces within a mobile node that are respectively associated with the multiple access networks to use comprises interpreting the bearer release message as a command to move the IP flow to another access network.

17. The mobile node of claim 10, wherein the receiver circuitry is also configured to access the multiple access networks at the same time.

18. The mobile node of claim 10, wherein the processor is configured with processor-executable instructions to perform operations such that the access network- specific signaling is received from an access gateway in an access network.

19. A method for facilitating network-based control of a forwarding policy, the method being implemented by a mobile node, the method comprising: receiving access network-specific signaling that is related to an Internet Protocol (IP) flow; and deciding which of a plurality of physical interfaces within the mobile node that are respectively associated with multiple access networks to use to send the IP flow via an uplink communication link from the mobile node based on the access network-specific signaling when the physical interfaces within the mobile node have no associated IP addresses, wherein the access-network specific signaling comprises a bearer modification message that causes a bearer to be modified so that a Traffic Flow Template (TFT) no longer covers the IP flow, and wherein said deciding which of the plurality of physical interfaces within a mobile node that are respectively associated with the multiple access networks to use comprises means for interpreting the bearer modification message as a command to move the IP flow to another access network.

20. The method of claim 19, wherein the access-network specific signaling is received from an access network, and wherein the access network-specific signaling comprises a request to set up quality of service (QoS) for the IP flow on the said access network.

21. The method of claim 19, wherein the access-network specific signaling is received from an access network, and wherein the access network-specific signaling comprises a bearer establishment message for the IP flow on the said access network.

22. The method of claim 19, wherein the access-network specific signaling is received from an access network, and wherein the access network-specific signaling comprises a bearer modification message for the IP flow on the said access network.

23. The method of claim 19, wherein deciding which of the plurality of physical interfaces within a mobile node that are respectively associated with the multiple access networks to use comprises updating the forwarding policy at the mobile node.

24. The method of claim 19, wherein the access network-specific signaling is received from an access network, and wherein deciding which of the plurality of physical interfaces within a mobile node that are respectively associated with the multiple access networks to use comprises: interpreting the access network-specific signaling as a command to send the IP flow over the access network from which the access network-specific signaling was received; and updating the forwarding policy at the mobile node to indicate that the IP flow should be sent over the access network from which the access network-specific signaling was received.

25. The method of claim 19, wherein the access-network specific signaling comprises a bearer release message, and wherein deciding which of the plurality of physical interfaces within a mobile node that are respectively associated with the multiple access networks to use comprises interpreting the bearer release message as a command to move the IP flow to another access network.

26. The method of claim 19, further comprising accessing the multiple access networks at the same time.

27. The method of claim 19, wherein the access network-specific signaling is received from an access gateway in an access network.

28. A non-transitory computer readable medium having stored thereon processor-executable instructions configured to cause a processor of a computer to perform operations for facilitating network-based control of a forwarding policy, comprising:
 receiving access network-specific signaling that is related to an Internet Protocol (IP) flow; and
 deciding which of a plurality of physical interfaces within a mobile node that are respectively associated with multiple access networks to use to send the IP flow via an uplink communication link from the mobile node based on the access network-specific signaling when the physical interfaces within the mobile node have no associated IP addresses,
 wherein the access-network specific signaling comprises a bearer modification message that causes a bearer to be modified so that a Traffic Flow Template (TFT) no longer covers the IP flow, and wherein said
 deciding which of the plurality of physical interfaces within a mobile node that are respectively associated with the multiple access networks to use comprises means for interpreting the bearer modification message as a command to move the IP flow to another access network.

29. The non-transitory computer readable medium of claim 28, wherein the stored processor-executable instructions are configured to cause a processor of a computer to perform operations such that the access network-specific signaling comprises a request to set up quality of service (QoS) for the IP flow on the said access network.

30. The non-transitory computer readable medium of claim 28, wherein the stored processor-executable instructions are configured to cause a processor of a computer to perform operations such that the access network-specific signaling comprises a bearer establishment message for the IP flow on the said access network.

31. The non-transitory computer readable medium of claim 28, wherein the stored processor-executable instructions are configured to cause a processor of a computer to perform operations such that the access network-specific signaling comprises a bearer modification message for the IP flow on the said access network.

32. The non-transitory computer readable medium of claim 28, wherein the processor-executable instructions are configured to cause a processor of a computer to perform operations further comprising updating the forwarding policy at the mobile node.

33. The non-transitory computer readable medium of claim 28, wherein the access network-specific signaling is received from an access network, and wherein the processor-executable instructions are configured to cause a processor of a computer to perform operations further comprising: interpreting the access network-specific signaling as a command to send the IP flow over the access network from which the access network-specific signaling was received; and updating the forwarding policy at the mobile node to indicate that the IP flow should be sent over the access network from which the access network-specific signaling was received.

34. The non-transitory computer readable medium of claim 28, wherein the access-network specific signaling comprises a bearer release message, and wherein the processor-executable instructions are configured to cause a processor of a computer to perform operations further comprising interpreting the bearer release message as a command to move the IP flow to another access network.

35. The non-transitory computer readable medium of claim 28, wherein the processor-executable instructions are configured to cause a processor of a computer to perform operations further comprising accessing the multiple access networks at the same time.

36. The non-transitory computer readable medium of claim 28, wherein the stored processor-executable instructions are configured to cause a processor of a computer to perform operations such that the access network-specific signaling is received from an access gateway in an access network.

* * * * *